(12) United States Patent
Chen et al.

(10) Patent No.: US 7,870,132 B2
(45) Date of Patent: Jan. 11, 2011

(54) CONSTRUCTING WEB QUERY HIERARCHIES FROM CLICK-THROUGH DATA

(75) Inventors: Weizhu Chen, Beijing (CN); Benyu Zhang, Beijing (CN); Zheng Chen, Beijing (CN); Jian Wang, Beijing (CN); Dou Shen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/020,574

(22) Filed: Jan. 28, 2008

(65) Prior Publication Data

US 2009/0193047 A1 Jul. 30, 2009

(51) Int. Cl.
*G06F 17/30* (2006.01)

(52) U.S. Cl. ............. 707/736; 707/748; 707/749; 707/758; 707/769; 707/706

(58) Field of Classification Search .......... 707/706, 707/709, 722, 723, 736, 748, 749, 758, 769, 707/770, 771, 774
See application file for complete search history.

(56) References Cited

U.S. PATENT DOCUMENTS

| | | | |
|---|---|---|---|
| 6,363,377 B1 * | 3/2002 | Kravets et al. ........... 1/1 |
| 7,346,629 B2 * | 3/2008 | Kapur et al. ............ 1/1 |
| 7,603,349 B1 * | 10/2009 | Kraft et al. ............ 1/1 |
| 7,634,462 B2 * | 12/2009 | Weyand et al. ......... 1/1 |
| 7,693,827 B2 * | 4/2010 | Zamir et al. ........... 1/1 |
| 2005/0080795 A1 * | 4/2005 | Kapur et al. ........ 707/100 |
| 2006/0167857 A1 * | 7/2006 | Kraft et al. .......... 707/3 |
| 2006/0179074 A1 * | 8/2006 | Martin et al. ....... 707/102 |
| 2006/0287993 A1 * | 12/2006 | Yao et al. ........... 707/4 |
| 2008/0027933 A1 * | 1/2008 | Hussam ............. 707/6 |

* cited by examiner

*Primary Examiner*—Jean M Corrielus
(74) *Attorney, Agent, or Firm*—Hope Baldauff Hartman, LLC

(57) ABSTRACT

The claimed subject matter is directed to constructing query hierarchies in response to a query request. To construct a query hierarchy, a list of related candidate queries is generated in response to the received query request. The list of related candidate queries is generated by determining the relative coverage of information shared by the candidate queries and the query request. Relationships between the submitted query request and the candidate queries in the list are determined based upon the extent of relative coverage of information shared by the candidate queries and the query request. A query hierarchy is then constructed to reflect the determined relationships between the query request and the candidate queries.

16 Claims, 4 Drawing Sheets

CONSTRUCTING WEB QUERY HIERARCHIES FROM CLICK-THROUGH DATA

BACKGROUND

The emergence of the Internet through the proliferation of networked computers and computerized devices has resulted in an exponential increase in the amount of information available for transfer and access. In August of 2005, an estimated 70 million websites containing 19.2 billion web pages were indexed by a popular Internet service website and an independent Internet research and data analysis company.

The evolution of the Internet into a global institution is due in large part to the introduction of an information system known as the World Wide Web ("the web"), a vast distributed database of documents known as "web pages." The web, accessed via the Internet, is composed of a seemingly limitless number of web pages dispersed across millions of independent computer systems all over the world in no discernable organization or morphology.

The sheer amount of information available on the web makes searching for a specific piece of information a daunting task. Mechanisms such as directories and search engines have been developed to index and search the information available on the web and thereby provide a means for Internet users to locate information of interest. These search services enable consumers to search the Internet for a listing of web sites based on a specific topic, product, or service of interest.

Typically, inquiring users submit a short query request consisting of a few words to one or more search engines, and obtain a list of search results in terms of web pages located online. These queries, returned search results and subsequent user clicks on and within the search results are termed "click-throughs." These click-throughs are often compiled into click-through logs which can be used to "mine" information about the queries and their respective associating websites.

The automated search technology that drives many current and traditional search engines rely in large part on complex database search algorithms that filter, select and rank web pages based on multiple criteria to determine "relevance," such as keyword density, and keyword location.

However, the search results generated by such mechanisms often rely on morphology-blind mathematical formulas and may be random and irrelevant. Web searchers often face the difficult challenge of phrasing a query effectively to locate the desired information of interest. Too general a query and the resulting list of web pages may be unreasonably large. Too specific a query risks the elimination of any web page results. Moreover, at any time a query obtains search results, the search results generated by such mechanisms are returned content-ignorant and without regard to taxonomy.

Furthermore, search engines that use automated search technology to catalog search results generally rely on invisible web site descriptions, or "meta tags," that are authored by web site promoters. Web site owners may freely tag their sites as they choose. Consequently, it is not uncommon for web site promoters to insert popular search terms into their web site meta tags which are inaccurate or irrelevant to attract additional consumer attention at little to no marginal cost. Consequently, this affects the usage of search engines by returning web sites with meta tags that correspond to a query, but do not in fact, contain any information pertinent or responsive to the query.

Finally, many web sites have similar meta tags, and current and traditional search engines are simply not equipped to incorporate human knowledge of the queries as well as their relationship to other content-related web pages. This problem will almost certainly worsen as more information and new web pages continue to be added to the web.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment is implemented to construct a query hierarchy. This embodiment includes receiving a user submitted query request. A list of related candidate queries is then generated. The relationships between the submitted query request and the candidate queries in the list are determined. The query hierarchy is constructed to reflect the determined relationships between the query request and the candidate queries.

In another embodiment, the list of related candidate queries is generated by determining the relative coverage of information shared by the candidate queries and the query request. The list of related candidate queries is filtered to remove candidate queries below a certain threshold of relative coverage with the query request. In a still further embodiment, the specificity of the query request and the candidate queries is determined and included in the calculation of relative coverage.

According to another embodiment, the determined relationships between the submitted query request and the candidate queries in the list are classified according to the relationship. In a still further embodiment, the classified relationships are thus arranged to represent a hierarchical structure to construct the query hierarchy.

Another embodiment is implemented as a computer environment for providing query result lists. A search engine is implemented by the computer system to achieve the functionality of the present invention. The search engine receives a query request from the user (e.g., one or more terms describing or exemplary of the subject queried) and generates a list of related candidate queries. In a still further embodiment, the relationships between the elements of the generated list and the received query request are determined and classified. The classified relationships are used to construct a query hierarchy, which is returned to the user as a query result list.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the claimed subject matter. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

The claimed subject matter is directed to constructing query hierarchies in response to a query request. To construct a query hierarchy, a list of related candidate queries is generated in response to the received query request. The list of related candidate queries is generated by determining the relative coverage of information shared by the candidate queries and the query request. Relationships between the submitted query request and the candidate queries in the list are determined based upon the extent of relative coverage of information shared by the candidate queries and the query request. A query hierarchy is then constructed to reflect the determined relationships between the query request and the candidate queries.

Figure 1:
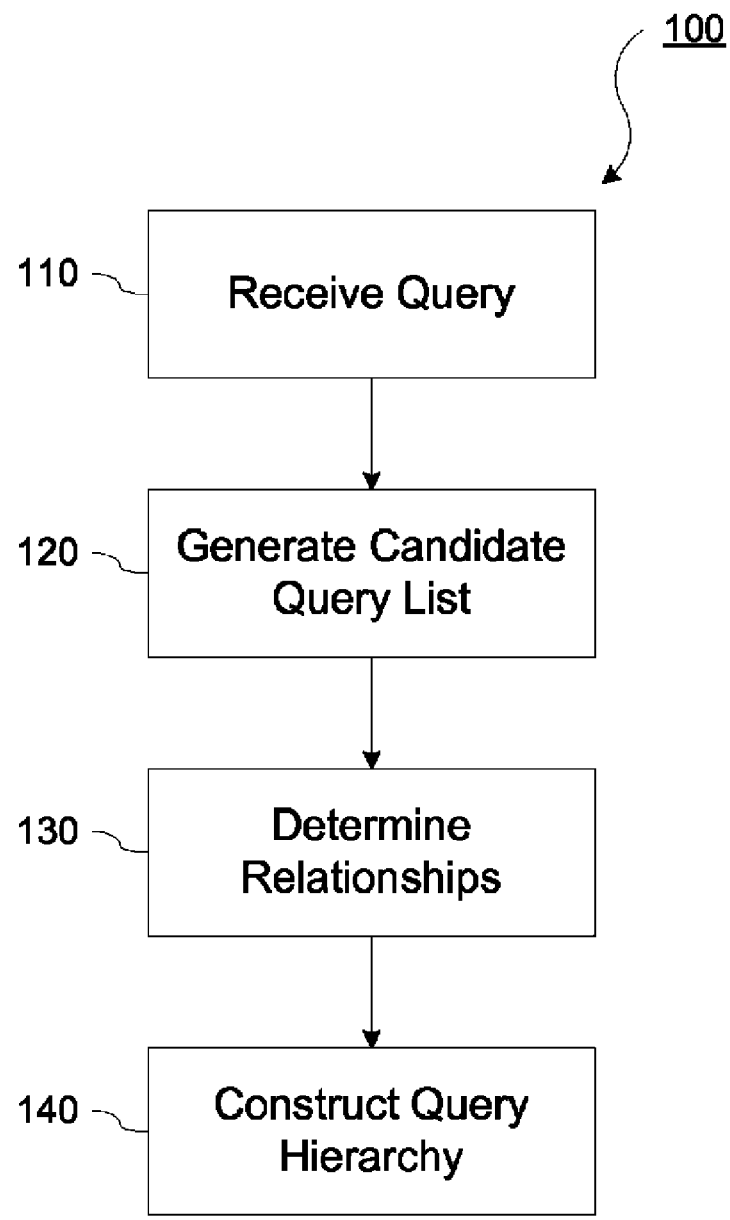
FIG. 1 is a flowchart describing a process for constructing a query hierarchy.

FIG. 1 is a flowchart describing a process 100 for constructing a query hierarchy. Steps 110-140 describe exemplary steps comprising the process 100 in accordance with the various embodiments herein described.

According to the process 100 of FIG. 1, a query consisting of one or more search terms is received by the user at step 110. A search term is typically entered as a brief description or an example of the subject of the query.

At step 120, a candidate query list is generated. The candidate query list is generated by determining a relative coverage ("RC") between the query received at step 110 and one or more candidate queries. The RC between two queries measures the extent to which the subject matter of a first query ($q_i$) is covered by the subject matter of a candidate query ($q_j$) and represented as $RC(q_i, q_j)$. In one embodiment, first query $q_i$ is the search term entered in an Internet search engine and the subject matter covered by the RC is the clicked pages of $q_i$ that are similar to the clicked pages of a separate candidate query $q_j$, as determined by click-through data collected through previous usages of the Internet search engine. The use of the collected click-through data incorporates human knowledge of the queries as well as their relationship to other content-related web pages.

RC(qi, qj) is defined by the following equation:

$$RC(q_i, q_j) = \frac{\sum_{n=1...N} \max_{m=1...M} sim(d_{in}, d_{jm})}{N} \quad (1)$$

In equation (1), $d_{in} \in D(q_i)$ and $d_{jm} \in D(q_j)$ where $D(q)$ is the set of clicked pages of query q. N and M are the sizes of $D(q_i)$ and $D(q_j)$, respectively. Sim ($d_{in}$, $d_{jm}$) measures the similarity between $d_{in}$ and $d_{jm}$, generally a cosine similarity.

The clicked pages of the first query $q_i$ can be represented in a number of ways. For example, with respect to $d_{in}$, the clicked pages of a query q can be represented by all the text in $di_n$ after removing the HTML (hypertext markup language) tags. In addition, the snippet (usually a query-dependant summary of the page) of $d_{in}$ generated by search engines for the first query $q_i$ can also be used to represent the clicked pages of first query $q_i$. Another example is to use the union of the queries which are related to din in the click-through data, which equals to $\{qk|d_{in} \in D(qk)\}$ to represent the clicked pages of first query $q_i$.

According to one embodiment, the consistency among the clicked pages of $q_i$ is also measured at step 120. The consistency among the clicked pages of $q_i$ may reflect the specificity of $q_i$. The specificity of a query is defined by the following equation:

$$Spec(q_i) = \frac{\sum_{n=1...N} \sum_{m=1...N; m \neq n} sim(d_{in}, d_{im})}{N(N-1)} \quad (2)$$

If most of the clicked pages of $q_i$ have similar pages among the clicked pages of candidate query $q_j$, the derived $RC(q_i, q_j)$ will be large. Conversely, if most of the clicked pages of $q_i$ are dissimilar to the clicked pages of $q_j$, the derived $RC(q_i, q_j)$ will be a lesser value. According to one embodiment, the candidate query list is further filtered to remove noise in the click-through data by eliminating candidate queries below a certain threshold value. This is represented by the following requirement for any candidate query $q_j$:

$$RC(q_i, q_j) > \theta_1 \text{ and } RC(q_j, q_i) > \theta_1 \quad (3)$$

Subsequently, in this embodiment, the candidate query list comprises the candidate queries which have an RC value greater than or equal to the threshold value $\theta_1$.

At step 130, the relationships between the first query and the candidate queries comprising the candidate query list are determined. According to one embodiment, the relationships are determined by estimating the relative generality and relative specificity of the received query and the candidate queries comprising the candidate query list. In a further embodiment, the relative generality and the relative specificity of the received query and the candidate queries comprising the candidate query list is estimated according to the following equations:

$$RC(q_j, q_i) - RC(q_i, q_j) > \theta_2 \quad (4.1)$$

$$RC(q_i, q_j) - RC(q_j, q_i) > \theta_2 \quad (4.2)$$

According to equation 4.1, if the difference between the relative coverage of the candidate query $q_j$ relative to the first query $q_i$ and the relative coverage of the first query $q_i$ relative to the candidate query $q_j$ is greater than a second threshold value $\theta_2$, the first query $q_i$ is more general (less specific) than the candidate query $q_j$. The relationship implied by estimating the relative generality and the relative specificity of the first query $q_i$ relative to the candidate query $q_j$ (and the candidate query qj relative to the first query $q_i$) is then classified. In a further embodiment, the relationship is classified by designating the first query $q_i$ as a parent of the candidate query $q_j$, which is similarly designated as a child of the first query $q_i$.

According to equation 4.2, if the difference between the relative coverage of the first query $q_i$ relative to a candidate query $q_j$ and the relative coverage of the candidate query $q_j$ relative to the first query $q_i$ is greater than the second threshold value $\theta_2$, the first query is more specific (less general) than the candidate query. The relationship implied by estimating the relative generality and the relative specificity of the first query $q_i$ relative to the candidate query $q_j$ (and the candidate query qj relative to the first query $q_i$) is then classified. In a further embodiment, the relationship is classified by designating the first query $q_i$ as a child of the candidate query qj, which is similarly designated as a parent of the first query $q_i$.

In the parent-child classifications as provided by the embodiments according to equation 4.1 and equation 4.2, the number of parent and children relationships a query has may have no upper-bound limit. Such classifications provide that a query $q_i$ is the parent of another query $q_j$ if most of the click-through data of $q_i$ corresponds to similar data to the click-through data of $q_j$, while a smaller fraction of the click-through data of $q_j$ corresponds to similar data to the click-through data of $q_i$.

Accordingly, for any two queries $q_i$ and $q_j$, if the difference according to equation 4.1 is not greater than the threshold value $\theta_2$, and the difference according to equation 4.2 is also not greater than the threshold value $\theta_2$, then the relationship is characterized by designating the first query as a sibling of the candidate query, and vice versa. Such designation provides that a query $q_i$ is the sibling of another query $q_j$ if the click-through data of $q_i$ includes similar data to the click-through data of $q_j$ of an approximately equivalent fraction that the click-through data of $q_j$ includes similar data to the click-through data of $q_i$. The threshold value $\theta_2$ provides the margin for approximating equivalence of the click-through data.

In a still further embodiment, the specificity of the first query $q_i$ ($Spec(q_i)$) and the specificity of the candidate query $q_j$ ($Spec(q_j)$), as determined by equation 2, are included in the equations 4.1 and 4.2 to estimate the relative generality and the relative specificity of the first query $q_i$ and the candidate query $q_j$. The resulting equations are provided below:

$$\frac{RC(q_i, q_j) + Spec(q_i)}{2} - \frac{RC(q_j, q_i) + Spec(q_j)}{2} > \theta_2 \quad (4.3)$$

$$\frac{RC(q_j, q_i) + Spec(q_j)}{2} - \frac{RC(q_i, q_j) + Spec(q_i)}{2} > \theta_2 \quad (4.4)$$

The addition of the respective specificities of the first query $q_i$ and the candidate query $q_j$ provides a further refined RC score between the two.

According to equation 4.3, if the sum of the relative coverage of the first query $q_i$ relative to the candidate query $q_j$ and the specificity of the first query $q_i$ is subtracted from the sum of the relative coverage of the candidate query $q_j$ relative to the first query $q_i$ and the specificity of the candidate query $q_j$, and the difference is greater than a second threshold value $\theta_2$, the first query is more general (less specific) than the candidate query. The relationship implied by estimating the relative generality and the relative specificity of the first query $q_i$ relative to the candidate query $q_j$ (and the candidate query $q_j$ relative to the first query $q_i$) is then classified. In a further embodiment, the relationship is classified by designating the first query $q_i$ as a parent of the candidate query $q_j$, which is similarly designated as a child of the first query $q_i$.

According to equation 4.4, if the sum of the relative coverage of the candidate query $q_j$ relative to the first query $q_i$ and the specificity of the candidate query $q_j$ is subtracted from the sum of the relative coverage of the first query $q_i$ relative to the candidate query $q_j$ and the specificity of the first query $q_i$, and the difference is greater than a second threshold value $\theta_2$, the first query is more specific (less general) than the candidate query. The relationship implied by estimating the relative generality and the relative specificity of the first query $q_i$ relative to the candidate query $q_j$ (and the candidate query $q_j$ relative to the first query $q_i$) is then classified. In a further embodiment, the relationship is classified by designating the first query $q_i$ as a child of the candidate query $q_j$, which is similarly designated as a parent of the first query $q_i$.

In the parent-child classifications as provided by the embodiments according to equation 4.3 and equation 4.4, the number of parent and children relationships a query has may have no upper-bound limit. Such classifications provide that a query $q_i$ is the parent of another query $q_j$ if most of the click-through data of $q_i$ corresponds to similar data to the click-through data of $q_j$, while a smaller fraction of the click-through data of $q_j$ corresponds to similar data to the click-through data of $q_i$.

Accordingly, for any two queries $q_i$ and $q_j$, if the difference according to equation 4.3 is not greater than the threshold value $\theta_2$, and the difference according to equation 4.4 is also not greater than the threshold value $\theta_2$, then the relationship is characterized by designating the first query as a sibling of the candidate query, and vice versa. Such designation provides that a query $q_i$ is the sibling of another query $q_j$ if the click-through data of $q_i$ includes similar data to the click-through data of $q_j$ of an approximately equivalent fraction that the click-through data of $q_j$ includes similar data to the click-through data of $q_i$. The threshold value $\theta_2$ provides the margin for approximating equivalence of the click-through data.

At step 140, the query hierarchy is constructed. The query hierarchy is constructed according to the relationships (determined in step 130) between a first query (received in step 110) and the candidate queries in the candidate query list (generated in step 120).

According to one embodiment, the query hierarchy is constructed by arranging the first query and the candidate queries based upon their derived relative classifications, as determined in a foregoing embodiment. The query hierarchy can be constructed, for example, by delineating the estimated generality and specificity of the queries, and arranged in a descending order of generality (ascending order of specificity). Likewise, the query hierarchy can be arranged in a descending order of specificity (ascending order of generality).

Figure 2:
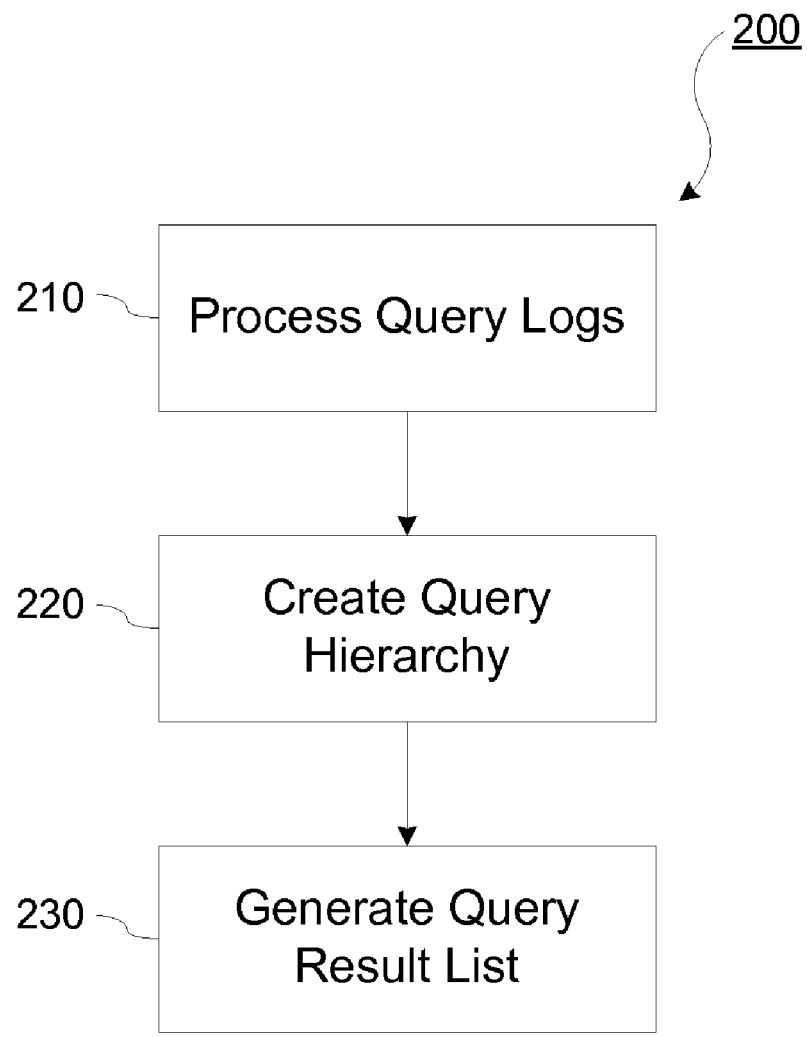
FIG. 2 is a flowchart describing a process for generating a query result list in response to a query request.

FIG. 2 is a flowchart describing a process 200 for generating a query result list in response to a query request. Steps 210-230 describe exemplary steps comprising the process 200 in accordance with the various embodiments herein described.

At step 210, a log of query requests is processed to mine information regarding the queries in the log, including the query request. In one embodiment the query request is a query in a search engine, and the log of queries is a database of information containing previous queries submitted to the search engine by one or more previous users of the search engine. According to this embodiment, the click-through data may include information of one or more previous queries, such as the returned query result list, and which (if any) of the returned query results were subsequently accessed through the search engine.

At step 220, a query hierarchy is constructed for the query request. In some embodiments, the query hierarchy may be constructed based upon the information mined from the click-through data from the log of queries. In a further embodiment the query hierarchy is constructed by determining the relative coverage between the query request and the candidate queries in the candidate query list relative to each other, determining the specificity of the query request and the candidate queries, estimating the relative generality and specificity of the query request and the candidate queries in the candidate query list from the determined relative coverage and specificity of the query request and the candidate queries in the candidate query list, and determining the relationships between the query request and the candidate queries in the candidate query list based upon the estimated relative generality and estimated relative specificity of each query, respectively. A detailed description of determining the relative coverage of a plurality of queries and determining the specificity of one or more queries has been provided by the foregoing description of step 120 of FIG. 1. As such, repetition is herein omitted. A detailed description of estimating the relative generality and specificity of a plurality queries and determining the relationships between a plurality of queries has been provided by the foregoing description of step 130 of FIG. 1. As such, repetition is herein omitted.

At step 230, a query result list is generated to display the query hierarchy constructed in step 220. According to one embodiment, the queries comprising the query hierarchy are classified according to their determined relationships. The queries are then delineated and subsequently arranged to represent a hierarchical structure according to class. The query hierarchy can be constructed, for example, by delineating the estimated generality and specificity of the queries, and arranged in a descending order of generality (ascending order of specificity). Likewise, the query hierarchy can be arranged in a descending order of specificity (ascending order of generality).

In one embodiment, the query result list is a resulting list of queries containing information that matches the query request. The query result list may, for example, return a list of queries organized according to the generality or specificity of the webpage relative to the query request. In a further embodiment, the queries which are determined to be more general than the query request are classified as a parent of the query request, the queries determined to be more specific than the query request are classified as a child of the query request, and the queries determined to be approximately as general and as specific as the query request are classified as a sibling of the query request.

Figure 3:
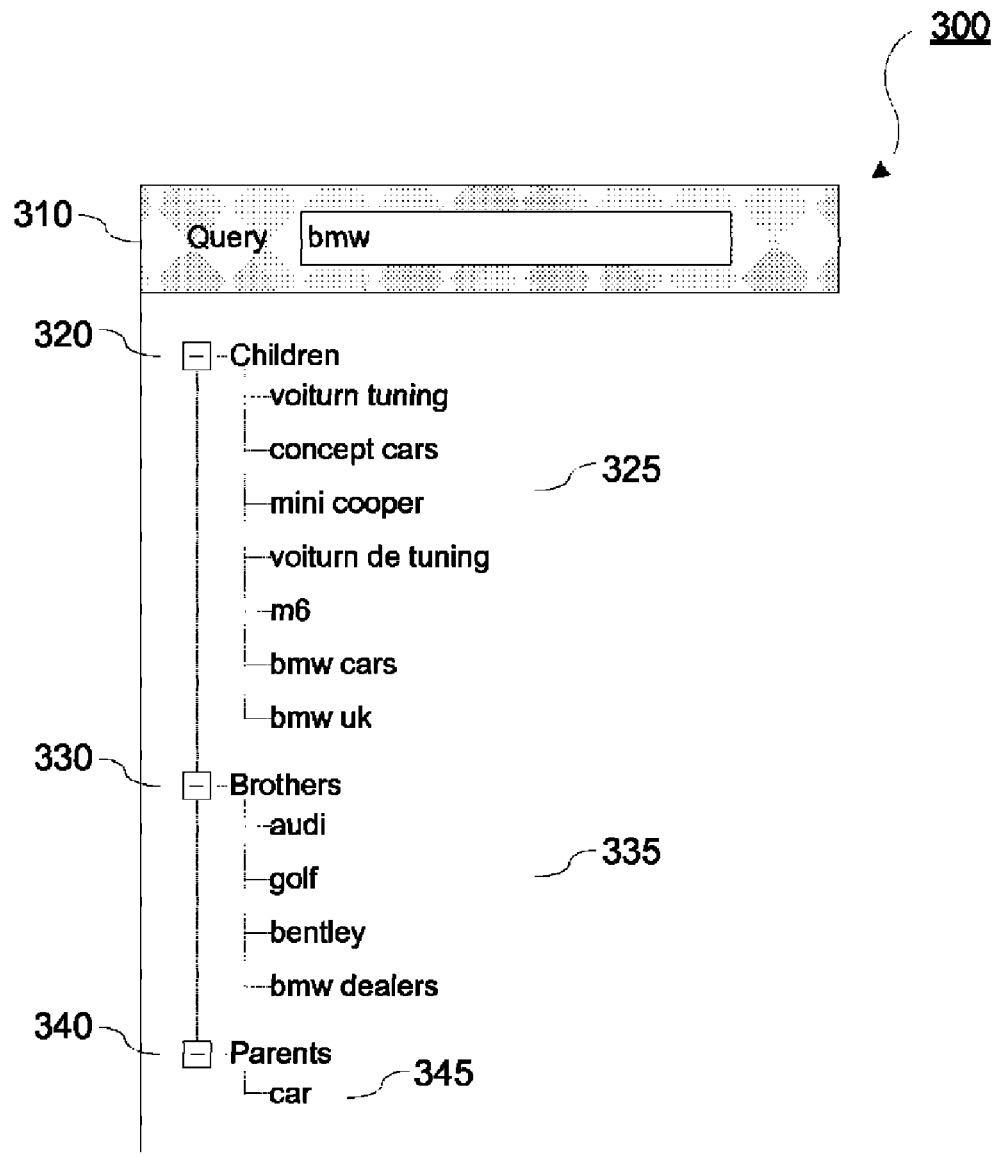
FIG. 3 is an example of possible output displaying an augmented route in accordance with various embodiments.

FIG. 3 is an example of possible output displaying a query result list 300 in accordance with various embodiments. In one embodiment, the query result list 300 is derived by an Internet search engine. The query result list 300 displays the resulting lists (325, 335, 345) of related queries generated to the query request 310. With reference to FIG. 3, the query request 310 is for the search term "bmw." Previous queries logged by the search engine and determined to be related to the query request 310 are classified into lists of query requests according to the determined generality and specificity of the previous query requests relative to the query request 310. The classified lists include a list of logged query requests which are more general/less specific, approximately as general/approximately as specific, and less general/more specific. In FIG. 3, the classification of more general/less specific is designated as Parents 340, the classification of approximately as general/approximately as specific is designated as Brothers 330, and the classification of less general/more specific is designated as Children 320.

In the example according to FIG. 3, a query request 310 such as "bmw," referring to BMW, an automobile manufacturer, may have a Parent 340 query such as "car" 345, which is more general than a "bmw" query. For example, a query such as "car" 345 will contain information (in the form of web pages, for example) related to a BMW, but may also contain information about automobile vehicles in general. Brothers 330, of a query request 310 of "bmw" would include queries of approximately equivalent generality/specificity. The list 335 of Brothers in FIG. 3 includes other automobile manufacturers and bmw dealers. In the latter case, while dealers of BMW may seem to be more specific than a general query of BMW, the ratio of shared information may be above the threshold of equivalence, which would result in a designation of a "bmw dealer" as a Brother 330 of "bmw," instead of being designated a Child 320. Children 320, of a query request 310 of "bmw" would include queries that are more specific and less general. The list 325 of Children in FIG. 3 includes specific models ("mini cooper," "m6"), features ("voiturn tuning", "voiturn de tuning") and concepts ("concept cars") related to BMWs in general. The list 325 also includes more specific queries related to the query request 310, but restricted in significant part to the query request 310 (e.g. "bmw cars," "bmw uk".

Figure 4:
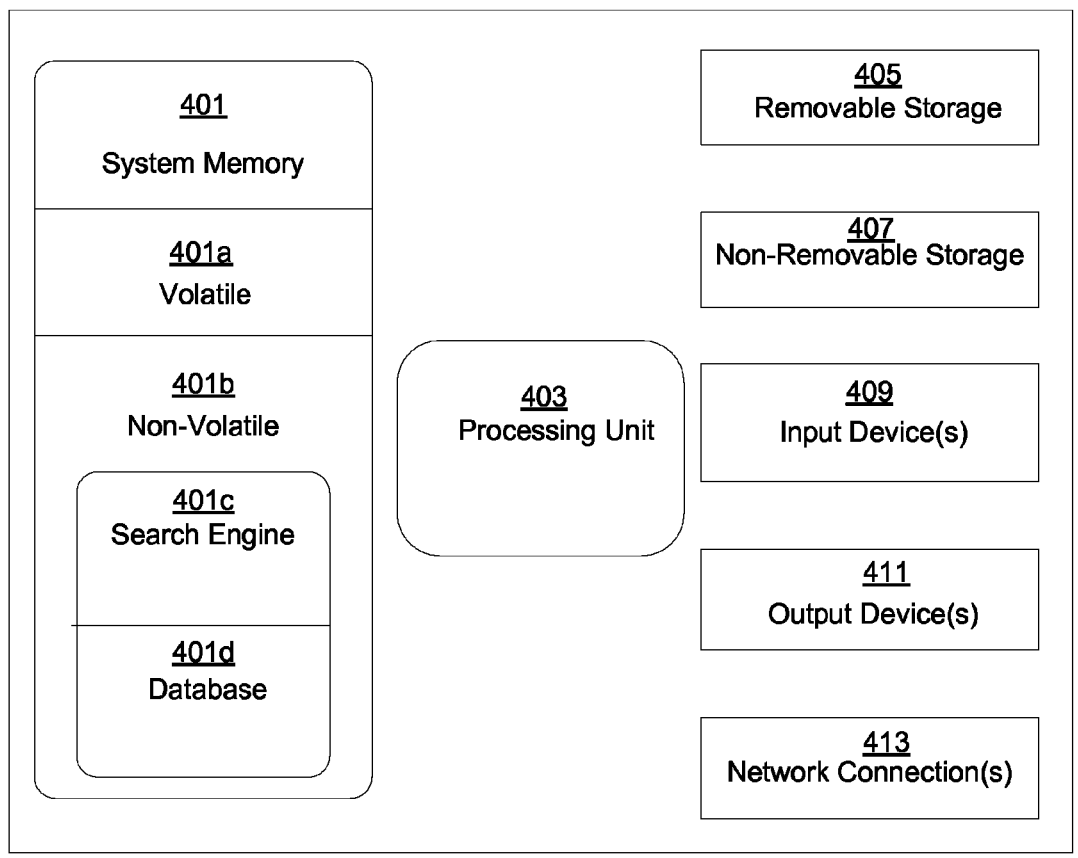
FIG. 4 shows an exemplary computing device in accordance with various embodiments.

FIG. 4 shows an exemplary computing device 400 according to various embodiments. Computing device 400 depicts the components of a basic computer system providing the execution platform for certain software-based functionality in accordance with various embodiments. Computing device 400 can be an environment upon which the search engine from various embodiments is instantiated. Computing device 400 can also be an environment upon which a user of the search engine interfaces with the search engine, and through which the user submits a query request. Computing device 400 can be implemented as, for example, a desktop computer system, laptop computer system or server computer system. Similarly, computing device 400 can be implemented as a handheld device (e.g., cell-phone, etc.) Computing device 400 typically includes at least some form of computer readable media. Computer readable media can be a number of different types of available media that can be accessed by computing device 400 and can include, but is not limited to, computer storage media.

In its most basic configuration, computing device 400 typically includes processing unit 403 and memory 401. Depending on the exact configuration and type of computing device 400 that is used, memory 401 can be volatile (such as RAM) 401a, non-volatile 401b (such as ROM, flash memory, etc.) or some combination of the two. In one embodiment, the search engine 401c is instantiated in the non-volatile memory 401b. Search engine 401c may include a database 401d, which stores data obtained through usage of the search engine 401c, such as click-through data or query history logs according to the foregoing embodiments.

Additionally, computing device 400 can include mass storage systems (removable 405 and/or non-removable 407) such as magnetic or optical disks or tape. Similarly, computing device 400 can include input devices 409 and/or output devices 411 (e.g., such as a display). Additionally, computing device 400 can include network connections 413 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for constructing a query hierarchy, the method comprising:
    receiving a first query;
    generating a candidate query list comprising one or more candidate queries, wherein the one or more candidate queries are determined based upon a relative coverage determined between the first query and each candidate query, the relative coverage between the first query and a candidate query representing a similarity between the content of pages clicked by a user in response to the candidate query and the content of pages clicked by a user in response to the first query determined from click-through data;

determining hierarchical relationships between the first query relative and each of the one or more candidate queries comprising the candidate query list, wherein each of the hierarchical relationships comprises one of a parent relationship, a child relationship, or a sibling relationship; and constructing a query hierarchy based on the hierarchical relationships between the first query and each of the one or more candidate queries comprising the candidate query list.

2. The method according to claim 1, wherein generating the candidate query list further comprises:

determining the relative coverage of the first query relative to each of the one or more candidate queries comprising the candidate query list; and determining the relative coverage of each of the one or more candidate queries comprising the candidate query list relative to the first query.

3. The method according to claim 2, wherein generating the candidate query list further comprises:

excluding from the candidate query list a first candidate query, where the relative coverage of the first query relative to the first candidate query is less than a threshold value; and excluding from the candidate query list a second candidate query, where the relative coverage of the second candidate query relative to the first query is less than the threshold value.

4. The method according to claim 2, wherein generating the candidate query list further comprises:

measuring a specificity of the first query; and measuring a specificity of each of the one or more candidate queries comprising the candidate query list, wherein the specificity of a query reflects the consistency of the content of pages clicked by a user in response to the query as determined from the click-through data.

5. The method according to claim 4, wherein determining the hierarchical relationship between the first query and a candidate query further comprises estimating a relative generality and specificity of the first query and the candidate query.

6. The method according to claim 5, wherein estimating the relative generality and specificity of the first query and the candidate query further comprises:

determining if the difference between the relative coverage of the first query relative to the candidate query and the relative coverage of the candidate query relative to the first query is greater than a second threshold value;

determining if the difference between the relative coverage of the candidate query relative to the first query and the relative coverage of the first query relative to the candidate query is greater than the second threshold value; and classifying the relationship between the first query and the candidate query as a parent relationship, a child relationship, or a sibling relationship according to determined differences, or lack thereof, in the relative coverage of the first query relative to the candidate query and the relative coverage of the candidate query relative to the first query.

7. The method according to claim 6, wherein classifying the hierarchical relationship between the first query and the candidate query further comprises determining a difference, or lack thereof, between:

a sum of the relative coverage of the first query relative to the candidate query and the measured specificity of the first query, and a sum of the relative coverage of the candidate query relative to the first query and the measured specificity of the candidate query.

8. The method according to claim 6, wherein constructing the query hierarchy further comprises arranging the first query and the candidate queries based upon their derived relative classification.

9. A method of generating a query result list in response to a query request, the method comprising:

processing a log of queries;

constructing a query hierarchy for the query request from the log of queries by generating a candidate query list of one or more candidate queries, wherein the one or more candidate queries in the candidate query list are determined based upon a relative coverage determined between the query request and each candidate query, the relative coverage between the query request and a candidate query representing a similarity between the content of pages clicked by a user in response to the candidate query and the content of pages clicked by a user in response to the query request determined from information obtained by mining click-through data, and determining relationships between the requested query and each of the one or more candidate queries in the candidate query list; and generating a query result list based on the query hierarchy.

10. The method according to claim 9, wherein creating the query hierarchy for the query request from the log of queries further comprises:

determining the relative coverage between the query request and each of the one or more candidate queries in the candidate query list relative to each other based upon the information obtained by mining the click-through data;

determining a specificity of the query request and each of the one or more candidate queries based upon the information obtained by mining the click-through data;

estimating a relative generality and specificity for the query request and each of the one or more candidate queries in the candidate query list from the determined relative coverage and the determined specificity of the query request and each of the one or more candidate queries in the candidate query list; and determining relationships between the query request and each of the one or more candidate queries in the candidate query list based upon the estimated relative generality and the estimated relative specificity.

11. The method according to claim 9, wherein generating the query result list further comprises:

classifying the determined relationships between the requested query and each of the one or more candidate queries as a parent relationship, a child relationship, or a sibling relationship; and arranging the requested query and the one or more candidate queries in a hierarchical structure based on the classifications of the determined relationships.

12. A system for generating a query hierarchy from a query request, the system comprising:

a computer system having a processor coupled to a memory;

a database stored in the memory containing click-through data; and a search engine stored in the memory comprising computer readable code, which when executed by the processor causes the computer system to perform the operations of
generating a candidate query list comprising one or more candidate queries in response to receiving the query request,
determining a relative coverage of the query request relative to each of the one or more candidate queries, wherein the relative coverage of the query request relative to a candidate query is based upon a similarity between the content of pages clicked by a user of the search engine in response to the query request and the content of pages clicked by a user of the search engine in response to the candidate query calculated by mining the click-through data,
determining a relative coverage of each of the one or more candidate queries relative to the query request,
determining a specificity of the query request and each of the one or more candidate queries by measuring a consistency of the content of the pages clicked by a user of the search engine in response to each query by mining the click-through data,
estimating a relative generality and specificity for the query request and each of the one or more candidate queries from the determined relative coverages and the determined specificity of the query request and each of the one or more candidate queries,
determining hierarchical relationships between the query request and the one or more candidate queries comprising the candidate query list, wherein each of the hierarchical relationships is classified as one of a parent relationship, a child relationship, or a sibling relationship,
generating the query hierarchy comprising the requested query and the one or more candidate queries arranged into a hierarchical structure based on the classification of each of the determined hierarchical relationships, and
returning the generated query hierarchy in response to the received query request.

13. The system according to claim 12, wherein the query request is sent from a remote computing device.

14. The system according to claim 13, wherein the remote computing device is a computer system.

15. The system according to claim 13, wherein the remote computing device is a hand-held computing device.

16. The system according to claim 13, wherein the query request is sent via the Internet.

* * * * *